US011712877B2

(12) United States Patent
Muslet et al.

(10) Patent No.: US 11,712,877 B2
(45) Date of Patent: Aug. 1, 2023

(54) ELASTOMERIC FILMS HAVING LOW TEAR PROPAGATION

(71) Applicant: Berry Global, Inc., Evansville, IN (US)

(72) Inventors: Iyad Muslet, West Chester, OH (US); Aniket Vyas, Loveland, OH (US)

(73) Assignee: Berry Global, Inc., Evansville, IN (US)

( * ) Notice: Subject to any disclaimer, the term of this patent is extended or adjusted under 35 U.S.C. 154(b) by 48 days.

(21) Appl. No.: 16/665,168

(22) Filed: Oct. 28, 2019

(65) Prior Publication Data

US 2020/0147944 A1 May 14, 2020

Related U.S. Application Data

(60) Provisional application No. 62/757,347, filed on Nov. 8, 2018.

(51) Int. Cl.
*B32B 27/12* (2006.01)
*B32B 5/02* (2006.01)
*B32B 25/14* (2006.01)
*B32B 27/32* (2006.01)
*B32B 25/08* (2006.01)

(52) U.S. Cl.
CPC .............. *B32B 27/12* (2013.01); *B32B 5/022* (2013.01); *B32B 25/08* (2013.01); *B32B 25/14* (2013.01); *B32B 27/32* (2013.01)

(58) Field of Classification Search
CPC ......... B32B 27/12; B32B 27/32; B32B 25/14; B32B 25/08; B32B 5/022
USPC ....................................................... 428/219
See application file for complete search history.

(56) References Cited

U.S. PATENT DOCUMENTS

| 7,442,332 B2 | 10/2008 | Cancio et al. |
| 9,492,332 B2 | 11/2016 | Cancio et al. |
| 9,498,941 B2 | 11/2016 | Sablone |
| 2004/0123939 A1* | 7/2004 | Griesbach, III ........ B32B 27/32 156/229 |
| 2011/0244185 A1 | 10/2011 | Dou et al. |
| 2013/0041335 A1 | 2/2013 | Dwiggins et al. |
| 2014/0134910 A1* | 5/2014 | Mansfield ............... B32B 27/12 442/394 |
| 2014/0255658 A1 | 9/2014 | Muslet et al. |
| 2015/0056424 A1 | 2/2015 | Muslet |
| 2017/0014282 A1* | 1/2017 | Erlandsson ............. A61L 15/56 |
| 2017/0087029 A1 | 3/2017 | Nelson et al. |
| 2018/0264163 A1 | 9/2018 | Muslet et al. |
| 2018/0311398 A1 | 11/2018 | Neton |
| 2020/0147944 A1* | 5/2020 | Muslet ..................... B32B 7/08 |

OTHER PUBLICATIONS

Search Report and Written Opinion of corresponding International Application No. PCT/US2019/058261 dated Jan. 15, 2020, all enclosed pages cited.
Extended European Search Report for European App. No. 19881875.9 dated Jun. 24, 2022, 7 pages.

* cited by examiner

*Primary Examiner* — Betelhem Shewareged
(74) *Attorney, Agent, or Firm* — Barnes & Thornburg LLP

(57) ABSTRACT

Laminates comprising at least one film and a nonwoven substrate, wherein the film comprises a polymeric composition comprising at least about 50% of one or more styrenic block copolymers, olefinic block copolymers, or combinations thereof; wherein the nonwoven substrate comprises at least one layer of spunbond material comprising ribbon-shaped fibers, wherein the laminate comprises ultrasonic bonds, thermal bonds, or combinations thereof and which have advantageous properties relative to a comparative laminate in which the nonwoven comprises non-ribbon shaped fibers.

19 Claims, No Drawings

ELASTOMERIC FILMS HAVING LOW TEAR PROPAGATION

RELATED APPLICATIONS

This application claims the benefit of priority of U.S. Provisional Patent Application No. 62/757,347, filed on Nov. 8, 2018, and incorporated herein by reference in its entirety.

FIELD OF THE INVENTION

The present invention relates to laminates comprising an elastomeric film and a nonwoven substrate comprising ribbon-shaped fibers, which exhibit a variety of desirable properties, including increased bond strength, extensibility, softness, drape ability and decreased noise. The films and laminates are suitable for use in a variety of products, including absorbent articles

BACKGROUND OF THE INVENTION

Elastomeric materials are used in disposable absorbent products to provide a snug but comfortable fit that conforms to the body. To ensure a snug fit, it is important that the materials are able to withstand typical conditions that occur while being worn, in particular, being stretched while maintained at or above normal body temperature. If an elastomeric material loses elasticity or integrity, for example by forming holes or becoming delaminated, the material is unsuitable for use in consumer products. In addition, because the elastomeric portion of disposable absorbent products often is in direct contact with the skin, it is important that it has a soft feel and good aesthetic properties.

Non-adhesively bonded laminates (e.g., ultrasonically or thermally bonded laminates) avoid the disadvantages and higher cost of laminates that primarily rely on adhesive bonding. However, ultrasonic bonding presents unique challenges during the manufacturing process of the laminates and during conversion of the laminates into absorbent articles. For example, ultrasonically bonded laminates also often exhibit undesirable physical characteristics, such as low bond strength (which results in delamination), lower peel strength, higher noise during use, and decreased drape ability, to name a few. Therefore, there is a continuing need to produce a laminate which is substantially free of adhesive and yet which exhibits properties that render them suitable for use in an absorbent article.

SUMMARY OF THE INVENTION

The present invention meets the aforementioned need by providing elastomeric films and laminates comprising the films, wherein the laminates exhibit sufficient strength to withstand the forces typically encountered in regular use of absorbent articles, and yet which are exceptionally quiet, soft to the touch and which drape easily. It has been found that careful control of the processing conditions, in combination with a suitable film formulation of both the outer skin and inner core layers, results in films that are particularly suitable for ultrasonic lamination. It has further been found that by employing nonwovens having ribbon-shaped fibers, the resulting laminates exhibit physical properties that exhibit surprisingly high elongation break, peel force and extension, as well as lower noise. It is demonstrated herein that the selective combination of particular styrenic block copolymers (SBCs), olefinic block copolymers (OBCs) in the film and ribbon-shaped fibers in the nonwoven, result in the surprising and superior properties of the laminate when manufactured using suitable process parameters described herein.

The following describe several non-limiting aspects of the laminates of the present invention.

In one aspect, a laminate is described which comprises at least one film and at least one nonwoven substrate, wherein the film comprises a polymeric composition comprising at least about 50% of one or more styrenic block copolymers, olefinic block copolymers, or combinations thereof; wherein the nonwoven substrate comprises at least one layer of spunbond material comprising ribbon-shaped fibers, wherein the laminate comprises ultrasonic bonds, thermal bonds, or combinations thereof and which has an extensibility of at least 10% greater than a comparative laminate in which the nonwoven comprises non-ribbon shaped fibers.

In another aspect, a laminate is described which comprises a film and two nonwoven substrates, wherein the film comprises a polymeric composition comprising at least about 50% of one or more styrenic block copolymers; wherein the nonwoven substrate comprises at least one layer of spunbond material comprising ribbon-shaped fibers, wherein the wherein the laminate comprises ultrasonic bonds, thermal bonds, or combinations thereof and exhibits a noise level of less than 45 dB.

In another aspect, a laminate is described which comprises a film and a nonwoven substrate, wherein the film comprises a polymeric composition comprising at least about 50% of one or more styrenic block copolymers; wherein the nonwoven substrate comprises at least one layer of spunbond material comprising ribbon-shaped fibers, wherein the wherein the laminate comprises ultrasonic bonds, thermal bonds, or combinations thereof and exhibits a noise level of at least 3 dB lower than a comparative laminate in which the nonwoven comprises non-ribbon shaped fibers.

A laminate comprising a film and a nonwoven substrate, wherein the film comprises a polymeric composition comprising at least about 50% of one or more styrenic block copolymers; wherein the nonwoven substrate comprises at least one layer of spunbond material comprising ribbon-shaped fibers, wherein the wherein the laminate comprises ultrasonic bonds, thermal bonds, or combinations thereof and exhibits a peel force of at least 15 N/cm lower than a comparative laminate in which the nonwoven comprises non-ribbon shaped fibers.

In yet another aspect, a method of making a laminate is provided, comprising the steps of providing a film comprising a polymeric composition comprises at least about 50% of one or more styrenic block copolymers, olefinic block copolymers, or combinations thereof; providing a nonwoven substrate comprising at least one layer of spunbond material comprising ribbon-shaped fibers; bonding the film and the nonwoven by means of ultrasonic bonding, thermal bonding or a combination thereof; to produce the laminates of the present invention. The method further may comprise the steps of pre-activating the film in one or both of the machine-direction or cross-direction and/or stretching the laminate in one or both of the machine-direction or cross-direction during lamination.

laminate according to claim 1, wherein the laminate forms at least one component of an absorbent article.

Yet another aspect of the present invention provides for absorbent articles comprising any of the laminates described herein, in which the laminate forms at least one component of an absorbent article. The absorbent article may be an ear, side panel, leg cuff and/or waistband.

In any of the aforementioned aspects, the styrenic block copolymer may comprise SBS, SIS, or combinations thereof.

In any of the aforementioned aspects, the polymeric composition may comprise from about 1% to about 30% of polystyrene.

In any of the aforementioned aspects, the film may have a basis weight of about 65 gsm or less.

In any of the aforementioned aspects, the film may be a multilayer film comprising at least one outer layer comprising polyethylene and/or polypropylene.

In any of the aforementioned aspects, each outer layer of the multilayer film may comprise from about 1% to about 20% of the total film thickness.

In any of the aforementioned aspects, the polypropylene in the outer layer may be present in an amount of at least about 70%.

In any of the aforementioned aspects, the polyethylene in the outer layer may be present in an amount of at least about 60%.

In any of the aforementioned aspects, the laminate may be substantially free of adhesive.

In any of the aforementioned aspects, the laminate may comprise at least two nonwoven substrates bonded to either side of the film.

DETAILED DESCRIPTION OF THE INVENTION

"Comparable laminate," "comparative laminate," or "laminate of the prior art" means a laminate which has a substantially similar film and nonwoven in terms of composition, thickness, basis weight and structure, the only significant difference being that the nonwoven is substantially free of flat, or "ribbon-shaped" fibers.

"Comparative percent (%) elongation at break" means the difference in the measured percentage of elongation, using tensile force test method ASTM method D822-02 as described herein, between a laminate of the present invention and a comparative laminate. For the sake of clarity, the percent elongation at break is [(length of laminate immediately prior to breaking–initial length of laminate prior to application of stretching force)/initial length of laminate prior to application of stretching force]×100.

"Comparative peel force," means the difference in measured peel force, as described herein, between a laminate of the present invention and a comparative laminate.

"Comparative sound pressure level," means the difference in measured sound pressure in dB, as described herein, between a laminate of the present invention and a comparative laminate.

"Low noise," "exhibiting low noise," or similar terms, means that the difference in measured noise level between a laminate of the present invention as compared to a comparative laminate, as defined herein, is at least 3 dB.

"Ribbon-shaped," or "flat" in reference to fibers, means that the cross-section of the fiber has a width which is at least 1.5× greater than the height. "Ribbon-shaped" is understood not to include cross-sectional shapes that are substantially round or circular, or which have an average cross-sectional width:height ratio of less than 1.5, referred to herein as "non-ribbon shaped," or "round" fibers.

"Substantially free of flat fibers," as used herein, means that a nonwoven comprises 10% or less of flat, or non-ribbon shaped, fibers.

"Substantially free of adhesive," as used herein, means that about 5% or less of the surface area of the laminate is adhesively bonded.

"Substantially non-adhesively bonded," or means that the primary means for bonding the film to the substrate is by a non-adhesive means, for example, ultrasonic bonding, thermal point bonding, or other suitable means, and that any adhesive that is present covers about 25% or less of the total surface area of the laminate.

The laminates described herein are elastomeric laminates, and comprise one or more elastomeric films and one or more nonwoven substrates which are made from flat, or ribbon-shaped, fibers. The films comprise one or more styrenic block copolymers, olefinic block copolymers, or combinations thereof. The films further may comprise polystyrene. The choice of polymer in the film will determine the physical properties of a laminate resulting from bonding the film to a nonwoven substrate having ribbon-shaped fibers. The films may be monolayer or multilayer films.

One type of useful film for ultrasonic bonding includes coextruded multilayer films and may have a structure in which relatively elastomeric layers (B) are alternated with relatively inelastic layers (A). In one particular embodiment, the films have a structure denoted by ABA, wherein A is the outer, or skin, layer and B is the inner, or core, layer. However, variations in the number and arrangement of the layers would be readily apparent to one of skill in the art. Herein, the SBCs and/or OBCs are understood to be present in the core layer (B), or core layers in a film having more than three layers, whereas in a monolayer film, the SBCs and/or OBCs are present throughout the film.

Suitable SBCs include but are not limited to styrene-butadiene-styrene (SBS), styrene-isoprene-styrene (SIS), styrene-isoprene-butylene-dtyrene (SIBS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, and copolymers and mixtures of any of the foregoing. Although any SBC may be used, particularly useful SBCs in the films of the present invention are non-hydrogenated SBCs, including but not limited to SBS, SIS and SIBS. Non-limiting examples of SBCs suitable for use in the present invention include those available from Dexco Polymers, Plaquemine, La., for example, VECTOR 4111A and VECTOR 7620.

Olefinic block copolymers (OBCs) suitable for use in the core layer include but are not limited to polypropylene-based (also termed "propylene-rich") olefinic block copolymers such as those sold under the trade name INFUSE, including INFUSE 9507 and 9100, by The Dow Chemical Company of Midland, Mich.; and the trade names VISTAMAXX and IMPACT, for example VISTAMAXX 6102, available from ExxonMobil Chemical Company of Houston, Tex. In one particular embodiment, the core layer comprises SIS, a polypropylene-based OBC and a polyethylene-based OBC.

The total amount of SBCs in the film or in a particular layer may be at least about 50%, from about 50% to about 99%, from about 60% to about 99%, from about 50% to about 95%, from about 55% to about 95%, from about 60% to about 95%, from about 65% to about 95%, from about 70% to about 95%, from about 75% to about 95%, from about 80% to about 95%, from about 70% to about 90%, or alternatively from about 80% to about 90%.

The films or particular layers of a film further may comprise polystyrene in an amount of about 30% or less, and alternatively 25% or less, 20% or less, or from about 1% to about 30%, from about 5% to about 25%, or from about 5% to about 20%. One example of polystyrene suitable for use in the present invention is STYROLUTION 3190, available from PolyOne Corporation, Avon Lake, Ohio.

The films further may comprise other elastomeric polymers, such as elastomeric olefinic random copolymers, polyurethanes, rubbers, vinyl arylenes and conjugated dienes, polyesters, polyamides, polyethers, polyisoprenes, polyneoprenes, copolymers of any of the above, and mixtures thereof.

The films further may comprise polyethylene (PE) and/or polypropylene (PP), including homopolymer polypropylene, impact copolymer polypropylene, as well as other types of polypropylene that would be apparent to one of skill in the art. Nonlimiting examples of suitable polyethylene include LDPE, LLDPE, MDPE, or HDPE. In one particular embodiment, the film comprises about 30% polypropylene in combination with an OBC.

In one embodiment, the polypropylene and/or polyethylene is present in the outer layers (the A-layers, or skin layers) of a multilayer film. Each outer layer may comprise polypropylene and/or polyethylene, each in an amount of at least about 10%, at least about 20%, at least about 30%, at least about 40%, at least about 50%, at least about 60%, at least about 70%, at least about 80%, from about 1% to about 90%, from about 10% to about 80%, from about 60% to about 80%, from about 60% to about 70%, from about 70% to about 80%, from about 20% to about 40%, from about 30% to about 40%, or from about 20% to about 30%. In one embodiment, the outer layers each comprise polypropylene in an amount of at least about 20%, and alternatively in an amount of from about 20% to about 85%. In an alternative embodiment, each outer layer comprises from about 70% to about 80% of polypropylene and from about 20% to about 30% of polyethylene. In yet another alternative embodiment, each outer layer comprises from about 60% to about 70% polyethylene and from about 30% to about 40% polypropylene.

Each outer layer further may comprise about 2.5%, 5%, 7.5%, 10%, 15% or 20% of the total film thickness. In some embodiments, the outer layers further each may have a thickness of from about 1% to about 20%, from 3% to about 15%, or from about 5% to about 15% of the total thickness of the film. Alternatively, the outer layers each may have a thickness of from about 1 micron to about 20 microns, or from about 1 microns to about 15 microns, from 1 micron to about 10 microns, from about 1 microns to about 7 microns, and alternatively from about 1 microns to about 5 microns. By way of illustration only, if the total thickness of the film is 100 microns and each outer layer has a thickness of 5 microns, then the outer layers comprise a total of 10% of the film thickness.

The films further may comprise a filler suitable to induce pore formation upon stretching, including but not limited to calcium carbonate. In one embodiment, the filler is present in an amount of from about 10% to about 70%, from about 20% to about 60%, or from about 30% to about 60%.

The films may include master batch and optional components or fillers, such as opacifiers, plasticizers, compatibilizers, draw down polymers, processing aids, anti-blocking agents, viscosity-reducing polymers, and the like.

The films may have a basis weight of from about 5 gsm to about 100 gsm, from about 5 gsm to about 65 gsm, from about 15 gsm to about 65 gsm, from about 15 gsm to about 55 gsm, from about 20 gsm to about 55 gsm, from about 25 gsm to about 55 gsm, from about 30 gsm to about 55 gsm, from about 35 gsm to about 55 gsm, from about 20 gsm to about 50 gsm, from about 25 gsm to about 45, from about 25 gsm to about 35 gsm, of less than about 65 gsm, less than about 60 gsm, less than about 55 gsm, less than about 50 gsm, less than about 45 gsm, less than about 40 gsm, less than about 35 gsm, less than about 30 gsm, less than about 25 gsm, or less than about 20 gsm.

The laminates comprise a substrate attached to one or both surfaces of the film, and may include more than one film and/or more than two laminates. The substrate may be attached to the film by a variety of means such as adhesive lamination, ultrasonic bonding, extrusion bonding, or other means that would be known to one of skill in the art. In one embodiment, the laminate is ultrasonically bonded, with the resulting laminates comprising ultrasonic welds, or bonds. In one embodiment, the laminate is substantially free of adhesive. In an alternative embodiment, the laminates are substantially non-adhesively bonded.

Substrates suitable for use herein are nonwoven substrates comprising ribbon-shaped, or "flat," fibers, such as those described in U.S. Patent Publication 2013/0041335, Dwiggins et al., published Feb. 14, 2013, and incorporated by reference herein in its entirety. Particularly useful substrates include those having at least one spunbond (S) and one meltblown (M) layer, one example being SMS substrates, wherein the spunbond layer comprises flat spunbond fibers, for example, NUVISOFT nonwovens (Berry Global, Inc.). The spunbond layer may comprise at least about 50%, 60%, 70%, 80%, or 90% flat spunbond fibers. In one embodiment, the nonwoven, or alternatively the spunbond layer consists, essentially of flat fibers. Alternatively, the nonwoven or the spunbond layer is substantially free of non-ribbon shaped fibers, understood to mean that less than 10% of the fibers are non-ribbon shaped.

In one embodiment, the substrate may have a basis weight of about 100 gsm or less, alternatively about 50 gsm or less, alternatively about 25 gsm or less, alternatively about 15 gsm or less, alternatively from about 1 gsm to about 100 gsm, from about 5 gsm to about 50 gsm, and alternatively from about 5 gsm to about 25 gsm.

The laminates may have a percent elongation at break of at least about 90%, at least about 220%, at least about 235%, from about 90% to about 500%, from about 90% to about 300%, or from about 90% to about 200%. The laminates may have a comparative percent elongation at break of at least about 15%, 20%, 25%, 30%, or from about 30% to about 100%, as defined herein.

The laminates may have a peel force of at least about 20 N/cm, 50 N/cm, 60 N/cm, 70 N/cm, 80 N/cm, 90 N/cm or 100 N/cm. The laminates may have a comparative peel force of at least about 15 N/cm, 20 N/cm, 30 N/cm, 40 N/cm, 50 N/cm, or from about 15 to about 100 N/cm.

The laminates may have a sound pressure level of less than about 45 dB, and a comparative sound pressure level of at least 3 dB, at least 5 dB, or from about 3 dB to about 10 dB.

The laminates further may have a comparative high speed force at break, measured at 1500 inches per minute, of at least 5 N.

The laminates may be ultrasonically bonded laminates having a soft feel and appearance. The laminates may exhibit little or no delamination when subjected to the tear propagation test.

Method

Any apparatus suitable for making coextruded films and laminates as described herein may be used, and would be readily understood by one of skill in the art. One example of an apparatus suitable for making the films of the present invention is described in, e.g., U.S. Pat. No. 9,492,332 (Cancio et al.) and U.S. Pat. No. 7,442,332 (Cancio et al.). Methods described generally therein also are suitable for producing the films of the present invention, with the exception of differences noted herein which contribute to the unique properties of the presently claimed films.

The webs, or films, of the present invention may be coextruded, and may be cast, blown, or formed by any other method which would result in the films described herein.

The thermoplastic polymeric film formulation may be blended in an extruder, with a screw speed of from about 50 rpm to about 75 rpm. During extrusion, the melt curtain temperature may be from about 400° F. to about 500° F. The exact temperature and screw speed will depend upon the formulation of the polymeric compositions. The web, or "melt curtain," comprising the polymeric composition may be extruded (or coextruded if a multilayer film is being formed) from an extruder across a first gap onto an embossed, or chill, roll to form a film, which may be further advanced to a stretching roller across a second gap. The stretching roller may form a nip with additional roller. The nip pressure may be carefully controlled in the range of from about 0 psi to about 100 psi.

The stretchability of the film may be increased by pre-activation, for example, by stretching in the cross-direction via CD (cross-directional) intermeshing, or CDI. The depth of intermeshing may vary from about 0 inches to about 0.250 inches, and in particular embodiments may be 0.120 inches, 0.140 inches, 0.160 inches or 0.180 inches. In one embodiment, machine direction interdigitating rollers are used in place of, or in addition to, cross-direction interdigitating rollers, either before or after the CDI section.

When mixing blends such as SIS and polystyrene, or SBS and polystyrene, the screw should provide good mixing to provide homogenous blend. An example of an appropriate mixing element is a Maddock mixer. The temperature profile is set to have a melting temperature between 380° F. and 420° F. for best mixing results.

The film may move from the CDI section to other components, including but not limited to, a corona treatment section, an annealing section, a second machine-direction orientation (MDO) section, and/or a winder, where it is then ready for its intended use. The films may be activated or unactivated prior to further use, and in one particular embodiment, the films are pre-activated in the CD and/or in the MD prior to use.

The resulting films are particularly suitable for lamination to a nonwoven or other suitable substrate. The films may be laminated by a variety of means, including coextrusion, adhesive, thermal point bonding, ultrasonic bonding, and other means of lamination that would be known to one of skill in the art. One non-limiting example of a useful method and apparatus for laminating the films to the nonwoven substrate is described in U.S. Pat. No. 9,498,491 (Sablone et al.).

The film may be activated, or stretched, prior to lamination in the cross-direction, the machine-direction, or both. The film may be stretched, for example, from two to ten times its original length or width.

An apparatus useful for laminating the film to the substrate is an ultrasonic lamination system, one non-limiting example of which is an FMD-M2-00013 lamination system, produced by Fameccanica North America, Inc. The resulting laminates also may be stretched in one or both of the cross-direction and the machine-direction, for example by diverging disks or other suitable means, prior to conversion into an absorbent article.

The films and/or laminates of the present invention are useful for a variety of purposes, including for example use in articles such as personal hygiene products, such as disposable absorbent products. Non-limiting examples include diapers, training pants, adult incontinence pads and pants, swimwear, sanitary napkins, tampons, panty liners, and/or as absorbent pads or breathable shields to protect clothing from fluids, such as perspiration in specific areas of the body.

The films and/or laminates are particularly useful as fasteners, waistbands and cuffs of absorbent articles. Accordingly, in one embodiment, the present invention is related to an absorbent article comprising the films and/or laminates described herein. In one embodiment, the absorbent article is a diaper. Other uses include as diaper backsheets or ears (closure tabs), pouches for packaging, wrapping products such as personal hygiene items, as well other uses for consumer products that would be apparent to one of skill in the art.

Test Methods

Peel Force is measured as set forth in ASTM F904-98.

Sound Pressure: Any apparatus suitable for measuring sound levels of films and laminates under simulated conditions of use (i.e., with continuous movement, such as twisting, expanding and contracting, or "crumpling," and the like) may be used, provided the same apparatus and method is used to measure all samples in the range of 2000-5000 Hz. The frequency range was divided into nine frequency ranges, the energy measured in dB in each of the ranges, and summed in a logarithmic manner to obtain the total measured dB level for a particular sample. The microphone is placed about 1.5 inches from, and not in contact with, the sample.

"Tensile strength," means the load required to induce a break ("load at break") in the film in either the cross-direction (CD) or the machine-direction (MD). Tensile strength is expressed in units of N/cm or equivalent units thereof, and is determined by ASTM method D822-02, using the following parameters: Sample Direction=MD×CD; Sample size=1 inch width×6 inch length; Test speed=20 in/min; Grip distance=2 inch. Grip size=3 inch wide rubber faced grips evenly gripping sample.

EXAMPLES

Table 1 includes data representing laminates in which the nonwoven contains flat fibers, as well as comparative examples in which the nonwoven is substantially free of flat fibers. The films were coextruded and have the structure AB/A, wherein A represents the outer, or skin, layers and B represents the inner, or core, layer. In all examples, the remainder of the polymeric composition of the A- or the B-layers is comprised of processing aids and master batch, as would readily be understood by one of skill in the art.

In Table 1, the notation "comparative" samples are substantially similar to the sample to which they are compared, the only exception being that in the comparative example, the nonwoven substrate is comprised of non-ribbon (or cylindrical) fibers. For the avoidance of doubt, all NUVI-SOFT nonwoven substrates used herein comprise flat (ribbon) fibers, whereas all other referenced nonwoven substrates comprise non-ribbon (or cylindrical) fibers. All nonwovens in all samples had a basis weight of 17 gsm.

All samples were laminated by ultrasonic bonding on an FMD-M2-00013 lamination system, manufactured by Fameccanica Data SPA.

The trilaminates in examples 1, 3, 5 and 7 comprise a film laminated to two NUVISOFT SMS nonwoven substrates, with one substrate laminated to each side of the film, to produce a trilaminate structure. The trilaminates of comparative examples 2, 4 and 6 comprise the same film as their comparative counterparts, laminated to two SMS nonwoven substrates having cylindrically-shaped, or non-ribbon shaped, fibers (Berry Global, Inc.). The trilaminate of comparative example 8 comprises the same film as its comparative counterpart, laminated to two SMS nonwoven substrates (Avgol), which also comprise non-ribbon shaped fibers.

The bilaminates in examples 9 and 11 comprise a film laminated to one NUVISOFT SMS nonwoven substrate having flat fibers (Berry Global, Inc.) to produce a bilaminate structure. The laminates of comparative examples 10 and 12 comprise the same film as their comparative counterparts, laminated to one SMS nonwoven substrates (Avgol), which comprises cylindrical fibers.

Examples 1-4 were made with multilayer films having an ABA layer construction. Outer layers (A) each are approximately 10%-20% of the total film thickness, and comprise about 80% polypropylene and about 20% polyethylene. Inner layer (B) comprises about 80% SIS and about 15% polystyrene, with the remainder comprising processing aids and master batch. During lamination, the films were stretched to twice the initial width in the cross-direction.

Examples 5 and 6 were made with multilayer films having an ABA layer construction. Outer layers A each are about 5-10% of the film thickness, and comprise about 30% polypropylene and about 70% polyethylene. Inner layer (B) comprises about 95% polyethylenic OBC, with the remainder comprising processing aids and master batch. During lamination, the films were stretched to four times the initial width in the cross-direction.

Example 7-10 were made with multilayer films having an ABA layer construction. Outer layers A each comprise from about 8% to about 12% of the total film thickness, and comprise about 70% polyethylene and about 30% polypropylene. Inner layer B comprises SBS.

Examples 11 and 12 were made with multilayer films having an ABA layer construction. Outer layers A each comprise from about 8% to about 12% of the total film thickness, and comprise about 70% polyethylene and about 30% polypropylene. Inner layer B comprises 94% of a polyethylenic OBC (Dow INFUSE), with the remainder of the film composition comprising masterbatch and processing aids.

All samples in Table 1 in which the nonwoven comprises ribbon-shaped fibers (samples 1, 3, 5, 7, 9, and 11) exhibit a significantly higher elongation at break relative to their comparative counterparts (samples 2, 4, 6, 8, 10 and 12).

The data in Table 1 show that bilaminates and trilaminates having a film comprising an SBC, such as SIS or SBS, or an OBC, and a nonwoven comprising flat fibers (samples 1, 3, 5, 7 and 9) are consistently quieter than laminates in which the nonwoven comprises non-ribbon shaped fibers (samples 2, 4, 6, 8 and 10). The bilaminate in which the film comprises an OBC (sample 11) do not exhibit advantageous noise properties relative to its comparative counterpart (sample 12), suggesting that in regard to this property, the flat fibers are responsible for producing the unexpectedly quieter laminates.

The data in Table further show that trilaminates having a film comprising an SBC or an OBC and a nonwoven comprising flat fibers (samples 1, 3, 5, and 7) exhibit significantly increased peel strength relative to laminates in which the nonwoven comprises non-ribbon shaped fibers (samples 2, 4, 6, and 8). Although trilaminates would be expected to exhibit higher peel strength than bilaminates, the fact that in the bilaminate samples (9-12) the comparative samples (10 and 12) actually exhibit a higher peel strength than samples 9 and 11, indicates that both the shape of the nonwoven fibers and the structure of the laminate are determinative factors in the physical characteristics of the laminates.

TABLE 1

| Sample No. | Description | Basis Weight Film (gsm) | Noise Level Laminate (dB) | Peel Force/ Bond Strength (N/cm) | Elong. At Break (%) | Extension (mm@ 1000 g) |
|---|---|---|---|---|---|---|
| 1 | Trilaminate Flat fibers B-layer: SIS + PS | 35 | 45 | 94 | 235 | N/A |
| 2 | Comparative to Sample 1 | 35 | 54 | 48 | 216 | N/A |
| 3 | Trilaminate Flat fibers B-layer: SIS + PS | 54 | 45 | 83 | 255 | N/A |
| 4 | Comparative to Sample 3 | 54 | 53 | 40 | 230 | N/A |
| 5 | Trilaminate Flat fibers B-layer: OBC | 45 | 42 | 28 | 97 | N/A |
| 6 | Comparative to Sample 5 | 45 | 46 | 11 | 79 | N/A |
| 7 | Trilaminate Flat fibers B-layer: SBS | 50 | 35 | 47 | N/A | 50 |
| 8 | Comparative to Sample 7 | 50 | 46 | 25 | N/A | 43 |
| 9 | Bilaminate Flat fibers B-layer: SBS | 50 | 40 | 8 | 504 | 52 |
| 10 | Comparative to Sample 9 | 50 | 43 | 10 | 421 | 48 |
| 11 | Bilaminate Flat Fibers B-layer: Olefinic | 35 | 45 | 8 | 332 | 47 |
| 12 | Comparative to Sample 11 | 35 | 43 | 20 | 329 | 44 |

The data in Table 1 show that the trilaminates of the present invention (Examples 1, 3 and 5) all have a higher peel force than those of the corresponding Comparative Example. This indicates higher strength of the ultrasonic bond between the film and the nonwovens. Increased bond strength would be expected to result in decreased extension. However, the laminates of the present invention actually exhibit greater extensibility, as evidenced by the higher elongation at break as compared to their Comparative Example counterparts. This combination of properties, in addition to the lower sound pressure levels of the laminates, are surprising and highly desirable in consumer products. Without wishing to be limited by theory, it is believed that the flat fibers of the nonwovens may have greater mobility or flexibility, which contributes to the observed desirable properties.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern. All ranges are inclusive and combinable. To the extent a value is not explicitly listed, it is understood to be implied as an option if included in a recited range.

Whereas particular embodiments of the present invention have been illustrated and described, it would be obvious to those skilled in the art that various other changes and modifications can be made without departing from the spirit and scope of the invention. It is therefore intended to cover in the present claims all such changes and modifications that are within the scope of this invention.

What is claimed is:

1. A laminate comprising a film and at least two nonwoven substrates; wherein the nonwoven substrates comprise at least one layer of spunbond material comprising ribbon-shaped fibers, wherein a cross-section of the ribbon-shaped fibers comprises a width that is at least 1.5 times greater than a height of the ribbon-shaped fibers, wherein the laminate comprises ultrasonic bonds, thermal bonds, or combinations thereof and which has an elongation at break which is at least 10% greater than a comparative laminate in which the nonwoven substrates comprise non-ribbon shaped fibers, wherein the at least two nonwoven substrates are bonded to either side of a same layer of the film, the film being a monolayer film, and wherein a peel force of the laminate is about 28 N/cm to about 100 N/cm.

2. The laminate according to claim 1, wherein the film comprises from about 1% to about 30% of polystyrene.

3. The laminate according to claim 1, wherein the film has a basis weight of about 65 gsm or less.

4. The laminate according to claim 1, wherein the film is a multilayer film comprising at least one outer layer comprising polyethylene and/or polypropylene.

5. The laminate according to claim 4, wherein the at least one outer layer comprises from about 5% to about 25% of the total film thickness.

6. The laminate according to claim 4, wherein the at least one outer layer of the film comprises polypropylene in an amount of at least about 70%.

7. The laminate according to claim 4, wherein the at least one outer layer of the film comprises polyethylene in an amount of at least about 60%.

8. The laminate according to claim 1, wherein the laminate is substantially free of adhesive.

9. The laminate according to claim 1, wherein the laminate comprises at least two nonwoven substrates bonded to either side of the film.

10. A laminate comprising a film and two nonwoven substrates, wherein the film is a multilayer film comprising at least one outer layer and a core layer, the two nonwoven substrates being directly bonded to a layer of the multilayer film, with the multilayer film being extruded as a single film; wherein the nonwoven substrates comprise at least one layer of spunbond material comprising ribbon-shaped fibers, wherein a cross-section of the ribbon-shaped fibers comprises a width that is at least 1.5 times greater than a height of the ribbon-shaped fibers, wherein the laminate comprises ultrasonic bonds, thermal bonds, or combinations thereof and exhibits a noise level of less than 45 dB, and wherein a peel force of the laminate is about 28 N/cm to about 100 N/cm.

11. The laminate according to claim 10, wherein the core layer comprises from about 1% to about 30% of polystyrene.

12. The laminate according to claim 10, wherein the film has a basis weight of about 65 gsm or less.

13. The laminate according to claim 10, wherein the laminate is substantially free of adhesive.

14. The laminate of claim 10, which has a peel force of at least 15 N/cm greater than a comparative laminate in which the nonwoven substrate comprises non-ribbon shaped fibers.

15. A laminate comprising a film and at least two nonwoven substrates bonded directly to said film, wherein the film is a monolayer film that comprises a polymeric composition comprising at least about 50% of one or more styrenic block copolymers; wherein the at least two nonwoven substrates comprise at least one layer of spunbond material comprising ribbon-shaped fibers, wherein a cross-section of the ribbon-shaped fibers comprises a width that is at least 1.5 times greater than a height of the ribbon-shaped fibers, wherein the laminate comprises ultrasonic bonds, thermal bonds, or combinations thereof and exhibits a noise level of at least 3 dB lower than a comparative laminate in which the nonwoven substrate comprises non-ribbon shaped fibers, and wherein a peel force of the laminate is about 28 N/cm to about 100 N/cm.

16. The laminate according to claim 15, wherein the styrenic block copolymer comprises SBS, SIS, or combinations thereof.

17. The laminate according to claim 15, wherein the polymeric composition further comprises from about 1% to about 30% of polystyrene.

18. The laminate of claim 1, wherein the film has a basis weight of about 45 gsm or less.

19. The laminate of claim 1, wherein a comparative peel force of the laminate is about 15 N/cm to about 100 N/cm greater than a bilaminate.

* * * * *